United States Patent
Tan et al.

(10) Patent No.: US 12,067,744 B2
(45) Date of Patent: Aug. 20, 2024

(54) SYSTEMS AND METHODS FOR CONTEXT-BASED DETECTION OF POSTURES OF A USER OF AN IHS (INFORMATION HANDLING SYSTEM)

(71) Applicant: Dell Products, L.P., Round Rock, TX (US)

(72) Inventors: Loo Shing Tan, Singapore (SG); Seng Khoon Teh, Singapore (SG); Ruizhi Joyce Lu, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 381 days.

(21) Appl. No.: 17/651,746

(22) Filed: Feb. 18, 2022

(65) Prior Publication Data

US 2023/0267637 A1  Aug. 24, 2023

(51) Int. Cl.
*G06T 7/70* (2017.01)
*G06T 7/11* (2017.01)
*G06T 7/194* (2017.01)
*G06V 10/764* (2022.01)
*G06V 40/10* (2022.01)

(52) U.S. Cl.
CPC .......... *G06T 7/70* (2017.01); *G06T 7/11* (2017.01); *G06T 7/194* (2017.01); *G06V 10/764* (2022.01); *G06V 40/10* (2022.01); *G06T 2207/10028* (2013.01); *G06T 2207/30196* (2013.01)

(58) Field of Classification Search
None
See application file for complete search history.

(56) References Cited

U.S. PATENT DOCUMENTS 9,870,622 B1 * 1/2018 Lu .......................... G16H 50/50
2023/0096950 A1 * 3/2023 Pfister .................... G16H 40/63
705/2

FOREIGN PATENT DOCUMENTS

CN       112116236 A  * 12/2020
WO     WO-0196147 A2  * 12/2001  ....... B60R 21/01538

OTHER PUBLICATIONS

Seo, J.—"Automated postural ergonomic risk assessment using vision-based posture classification"—Automation in Construction 128 (2021)—Apr. 2021—pp. 1-12 (Year: 2021).*

* cited by examiner

Primary Examiner — Bernard Krasnic
(74) Attorney, Agent, or Firm — Fogarty LLP

(57) ABSTRACT

Systems and methods detect the posture of a user of an IHS (Information Handling System). An image is generated of a user and of the physical environment in which the user is operating the IHS. The image is processed to generate segregated images of the user and of the physical environment. The segregated image of the physical environment is classified as corresponding to a known environment in which the user has operated the IHS and that is associated with a probability of an ergonomic posture being used while in that particular environment. The segregated image of the user is processed to determine a physical posture of the user relative to the IHS. An ergonomic risk score is generated based on deviations of the user's posture from an ideal posture. The ergonomic risk score is scaled based on the probability of an ergonomic posture being used, due to the environment.

20 Claims, 3 Drawing Sheets

SYSTEMS AND METHODS FOR CONTEXT-BASED DETECTION OF POSTURES OF A USER OF AN IHS (INFORMATION HANDLING SYSTEM)

FIELD

This disclosure relates generally to Information Handling Systems (IHSs), and more specifically, to supporting ergonomic use of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs that are utilized for personal use, such personal computers, laptops, tablets, smartphones, etc., are increasingly likely to be regularly utilized for long intervals of time. Uninterrupted use of IHSs without breaks has been demonstrated to be potentially harmful, both physically and psychologically, to the user. For instance, users may experience physical side effects from regular and continued use of an IHS while physically positioned in non-ergonomic postures, such as while slouching in a chair. More recently, users are choosing to operate IHS from standing positions in order to improve their ergonomic positioning relative to the IHS.

SUMMARY

In various embodiments, Information Handling Systems (IHSs) may include: one or more processors; one or more cameras; a memory device coupled to the one or more processors, the memory device storing computer-readable instructions that, upon execution by the one or more processors, cause the IHS to: utilize the one or more cameras of the IHS to generate a two-dimensional image of a user of the IHS and of a portion of the physical environment in which the user is located while operating the IHS; process the image to generate segregated images of the user and of the physical environment in which the user is located; classify the segregated image of the physical environment as corresponding to a known physical environment in which the user has operated the IHS, wherein the known physical environment is associated with a probability of the user being in an ergonomic posture while operating the IHS in that environment; use the segregated image of the user to determine a physical posture of the user relative to the IHS; generate an ergonomic risk score based on deviations of the determined posture of the user from an ideal posture; and scale the ergonomic risk score based on the probability of the user being in an ergonomic posture while operating the IHS in the physical environment.

In some IHS embodiments, the ergonomic risk score is tabulated using a Rapid Upper Limb Assessment (RULA) ergonomic scoring system. In some IHS embodiments, the segregated image of the physical environment comprises at least one of a background behind the user and a foreground in front of the user. In some IHS embodiments, the foreground in front of the user comprises a working surface and I/O devices resting on the working surface. In some IHS embodiments, the segregated image of the physical environment is classified as corresponding to a known physical environment based on a comparison of the segregated image of the physical environment to a library of images corresponding to a plurality of physical environments templates. In some IHS embodiments, the segregated image of the physical environment is classified as corresponding to a known physical environment based on wireless signal information collected by the IHS that specifies a physical location of the IHS. In some IHS embodiments, the template physical environments specify whether the user is sitting or standing when operating the IHS in a respective physical environment. In some IHS embodiments, when a template physical environment specifies the user is sitting, the probability of the user being positioned in an ergonomic posture results in the risk score being scaled upwards. In some IHS embodiments, when a template physical environment specifies the user is standing, the probability of the user being positioned in an ergonomic posture results in the risk score being scaled downwards. In some IHS embodiments, further execution of instructions by the one or more processors causes the IHS to: utilize a time-of-flight sensor of the IHS to generate a three-dimensional image of the user for use in determining the physical posture of the user relative to the IHS, wherein the three-dimensional image of the user comprises a plurality of measurements of distances from locations on the body of the user to the IHS. In some IHS embodiments, further execution of instructions by the one or more processors causes the IHS to: identify a plurality of physical feature landmarks of the user in the two-dimensional image generated using the one or more cameras; and overlay the physical feature landmarks of the user onto the three-dimensional image. In some IHS embodiments, overlaying the physical feature landmarks onto the three-dimensional image of the user provides distances of the respective physical feature landmarks to the IHS. In some IHS embodiments, the respective distances of the physical feature landmarks from the IHS are utilized to determine the physical posture of the IHS. In some IHS embodiments, the physical feature landmarks comprise locations corresponding to at least one of the user's eyes, shoulders, mouth, nose, chin, and top of the user's head.

In various additional embodiments, methods are provided for context-based determination of a posture of a user of an Information Handling System (IHS). The methods may include: utilizing one or more cameras of the IHS to generate a two-dimensional image of the user of the IHS and of a portion of the physical environment in which the user is located while operating the IHS; processing the image to generate segregated images of the user and of the physical environment in which the user is located; classifying the segregated image of the physical environment as corresponding to a known physical environment in which the user has operated the IHS, wherein the known physical environment is associated with a probability of the user being in an ergonomic posture while operating the IHS in that environment; using the segregated image of the user to determine a physical posture of the user relative to the IHS; generating an ergonomic risk score based on deviations of the determined posture of the user from an ideal posture; and scaling the ergonomic risk score based on the probability of the user being in an ergonomic posture while operating the IHS in the physical environment.

In some method embodiments, the ergonomic risk score is tabulated using a Rapid Upper Limb Assessment (RULA) ergonomic scoring system. In some method embodiments, the segregated image of the physical environment comprises at least one of a background behind the user and a foreground in front of the user.

In various additional embodiments, computer-readable storage devices may include instructions stored thereon for context-based determination of a posture of a user of an Information Handling System (IHS), wherein execution of the instructions by one or more processors of the IHS causes the one or more processors to: utilize one or more cameras of the IHS to generate a two-dimensional image of the user of the IHS; utilize one or more cameras of the IHS to generate a two-dimensional image of a user of the IHS and of a portion of the physical environment in which the user is located while operating the IHS; process the image to generate segregated images of the user and of the physical environment in which the user is located; classify the segregated image of the physical environment as corresponding to a known physical environment in which the user has operated the IHS, wherein the known physical environment is associated with a probability of the user being in an ergonomic posture while operating the IHS in that environment; use the segregated image of the user to determine a physical posture of the user relative to the IHS; generate an ergonomic risk score based on deviations of the determined posture of the user from an ideal posture; and scale the ergonomic risk score based on the probability of the user being in an ergonomic posture while operating the IHS in the physical environment.

In some storage device embodiments, the segregated image of the physical environment is classified as corresponding to a known physical environment based on a comparison of the segregated image of the physical environment to a library of images corresponding to a plurality of physical environments templates. In some storage device embodiments, the template physical environments specify whether the user is sitting or standing when operating the IHS in a respective physical environment.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
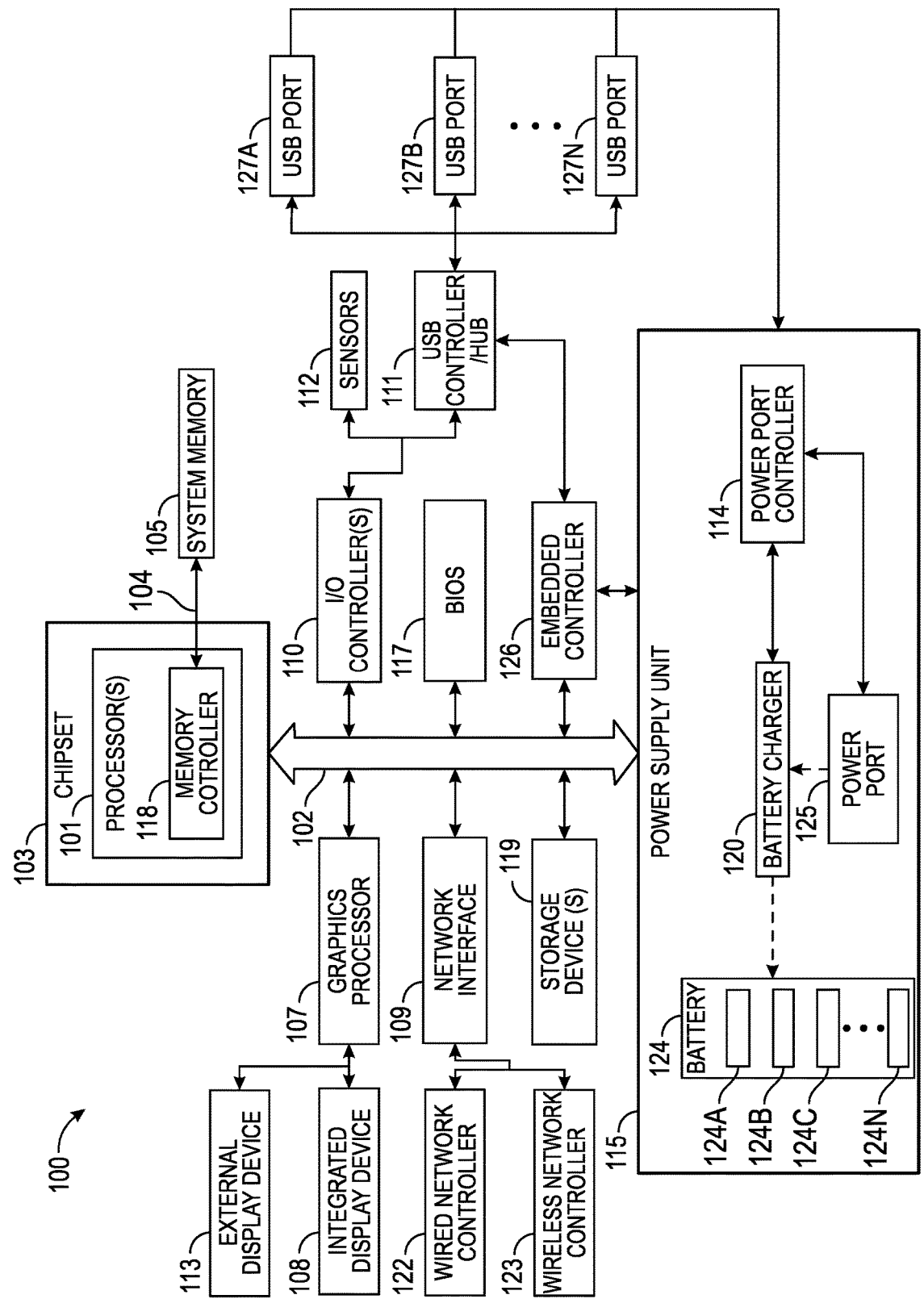
FIG. 1 is a block diagram depicting certain components of an IHS operable according to various embodiments for context-based detection of physical postures of a user of the IHS.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram depicting certain components of an IHS 100 operable according to various embodiments for context-based detection of physical postures of a user of the IHS. As described in additional detail below, IHS 100 may include capabilities for identifying and evaluating the posture in which the user of IHS 100 is physically positioned relative to the IHS, where such determinations may be made based on data collected from various I/O capabilities supported by the IHS 100. In addition, embodiments may also utilize data collected by the IHS 100 to make sure posture determinations based on the physical environment in which the user is operating the IHS. In various embodiments, IHS 100 may include an embedded controller 126 that includes logic that executes program instructions, in conjunction with operations by components of power supply unit 115 and the operating system of IHS 100, to perform the operations disclosed herein for collecting data for use in context-based detection of physical postures of a user of the IHS 100. While a single IHS 100 is illustrated in FIG. 1, IHS 100 may be a component of an enterprise system that may include any number of additional IHSs that may also be configured in the same or similar manner to IHS 100.

IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101.

The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NICs), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by applications of the operating system of IHS 100.

Chipset 103 may also provide access to one or more display device(s) 108, 113 via graphics processor 107. In certain embodiments, graphics processor 107 may be comprised within a video or graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100. The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. As illustrated, IHS 100 may support an integrated display device 108, such as a display integrated into a laptop, tablet, 2-in-1 convertible device, or mobile device. In some embodiments, IHS 100 may be a hybrid laptop computer that includes dual integrated displays incorporated in both of the laptop panels. IHS 100 may also support use of one or more external displays 113, such as external monitors that may be coupled to IHS 100 via various types of couplings.

In certain embodiments, chipset 103 may utilize one or more I/O controllers 110 that may each support hardware components such as user I/O devices and sensors 112. For instance, I/O controller 110 may provide access to one or more user I/O devices such as a keyboard, mouse, touchpad, touchscreen, microphone, speakers, camera and other input and output devices that may be coupled to IHS 100. Each of the supported user I/O devices may interface with the I/O controller 110 through wired or wireless connections. In some embodiments, the I/O devices that may be accessible by IHS 100 may include one or more cameras, that may be integrated component(s) of the IHS, or that may be an external device(s) coupled to the IHS through a wired or wireless coupling. As described in additional detail below, embodiments may utilize one or more cameras of the IHS in identifying and evaluating the posture in which the user of IHS 100 is physically positioned relative to the IHS. In particular, two-dimensional images captured using camera (s) of the IHS may be used to identify and locate landmark features of a user, which may be used in determining the posture in which the user is currently positioned, relative to the IHS.

In certain embodiments, sensors 112 that may be accessed via I/O controllers 110 may provide access to data describing environmental and operating conditions of IHS 100. For instance, sensors 112 may include geo-location sensors capable for providing a geographic location for IHS 100, such as a GPS sensor or other location sensors configured to determine the location of IHS 100 based on triangulation and network information. In some embodiments, such location information may be utilized in identifying the physical environment in which the user is operating the IHS. For example, GPS signal information or other network signal information may be used to confirm the user is operating the IHS from within their office. In another instance, a Bluetooth signal emitted by a docking station may be used to confirm the user is operating the IHS from a specific location where the user utilizes a desk and an external monitor. As described in additional detail below, posture detection capabilities provided by embodiments may utilize such environmental information to improve the accuracy of the posture determinations.

Various additional sensors, such as optical, infrared and sonar sensors, that may provide support for xR (virtual, augmented, mixed reality) sessions hosted by the IHS 100. Such sensors 112 may capabilities for detecting when a user is detected within a certain proximity to IHS 100. For instance, sensors 112 may detect when a user is in close proximity to the IHS 100 and, in some cases, whether the user is facing the display(s) 108, 113.

In some embodiments, the sensors 112 that are accessible by IHS 100 may include depth sensors, such as time-of-flight sensors that may utilize infrared, or other imperceptible wavelengths of signal information, to determine the distance of objects from the IHS. In particular, these time-of-flight sensors may be used to measure the distance of the user from the IHS 100 at various different locations on the body of the user. Using the distance information collected by the time-of-flight sensors, a three-dimensional image of the user may be constructed. By combining the two-dimensional images captured using one or more cameras of the IHS 100 with the three-dimension information captured by the time-of-flight sensors, embodiments are able to estimate the distance from each the landmarks physical features of the user to the IHS. Using this distance information, embodiments determine a posture in which the user is physically positioned relative to the IHS.

As illustrated, I/O controllers 110 may include a USB controller 111 that, in some embodiments, may also implement functions of a USB hub. In some embodiments, USB controller 111 may be a dedicated microcontroller that is coupled to the motherboard of IHS 100. In other embodiments, USB controller 111 may be implemented as a function of another component, such as a component of a SoC (System on Chip) of IHS 100, embedded controller 126, processors 101 or of an operating system of IHS 100. USB controller 111 supports communications between IHS 100 and one or more USB devices coupled to IHS 100, whether the USB devices may be coupled to IHS 100 via wired or wireless connections. In some embodiments, a USB controller 111 may operate one or more USB drivers that detect the coupling of USB devices and/or power inputs to USB ports 127a-n. USB controller 111 may include drivers that implement functions for supporting communications between IHS 100 and coupled USB devices, where the USB drivers may support communications according to various USB protocols (e.g., USB 2.0, USB 3.0). In providing functions of a hub, USB controller 111 may support concurrent couplings by multiple USB devices via one or more USB ports 127a-n supported by IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

As illustrated, IHS 100 also includes a BIOS (Basic Input/Output System) 117 that may be stored in a non-volatile memory accessible by chipset 103 via bus 102. In some embodiments, BIOS 117 may be implemented using a dedicated microcontroller coupled to the motherboard of IHS 100. In some embodiments, BIOS 117 may be implemented as operations of embedded controller 126. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 100 embodiments may utilize an embedded controller 126 that may be a motherboard component of IHS 100 and may include one or more logic units. In certain embodiments, embedded controller 126 may operate from a separate power plane from the main processors 101, and thus from the operating system functions of IHS 100. In some embodiments, firmware instructions utilized by embedded controller 126 may be used to operate a secure execution environment that may include operations for providing various core functions of IHS 100, such as power management and management of certain operating modes of IHS 100.

Embedded controller 126 may also implement operations for interfacing with a power supply unit 115 in managing power for IHS 100. In certain instances, the operations of embedded controller may determine the power status of IHS 100, such as whether IHS 100 is operating strictly from battery power, whether any charging inputs are being received by power supply unit 115, and/or the appropriate mode for charging the one or more battery cells 124a-n using the available charging inputs. Embedded controller 126 may support routing and use of power inputs received via a USB port 127a-n and/or via a power port 125 supported by the power supply unit 115. In addition, operations of embedded controller 126 may interoperate with power supply unit 115 in order to provide battery status information, such as the charge level of the cells 124a-n of battery 124.

In some embodiments, embedded controller 126 may also interface with power supply unit 115 in monitoring the battery state of battery 124, such as the relative state of charge of battery 124, where this charge level of the battery 124 may be specified as a percentage of the full charge capacity of the battery 124. In some instance, when operating from power stored in battery system 124, embedded controller 126 may detect when the voltage of the battery system 124 drops below a low-voltage threshold. When the charge level of battery 124 drops below such a low-voltage threshold, embedded controller 126 may transition the IHS to an off-power state in implementing a battery protection mode that preserves a minimal power level in battery 124.

Embedded controller 126 may also implement operations for detecting certain changes to the physical configuration of IHS 100 and managing the modes corresponding to different physical configurations of IHS 100. For instance, where IHS 100 is a laptop computer or a convertible laptop computer, embedded controller 126 may receive inputs from a lid position sensor that may detect whether the two sides of the laptop have been latched together, such that the IHS is in a closed position. In response to lid position sensor detecting latching of the lid of IHS 100, embedded controller 126 may initiate operations for shutting down IHS 100 or placing IHS 100 in a low-power mode. In this manner, IHS 100 may support the use of various power modes. In some embodiments, the power modes of IHS 100 may be implemented through operations of the embedded controller 126 and power supply unit 115.

As described, IHS 100 may also include a power supply unit 115 that receives power inputs used for charging batteries 124 from which the IHS 100 operates. IHS 100 may include a power port 125 to which an AC adapter may be coupled to provide IHS 100 with a supply of DC power. The DC power input received at power port 125 may be utilized by a battery charger 120 for recharging one or more internal batteries 124 of IHS 100. As illustrated, batteries 124 utilized by IHS 100 may include one or more cells 124a-n that may connected in series or in parallel. Power supply unit 115 may support various modes for charging the cells 124a-n of battery 124 based on the power supply available to IHS 100 and based on the charge levels of the battery system 124. In certain embodiments, power supply unit 115 of IHS 100 may include a power port controller 114 that is operable for configuring operations by power port 125.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
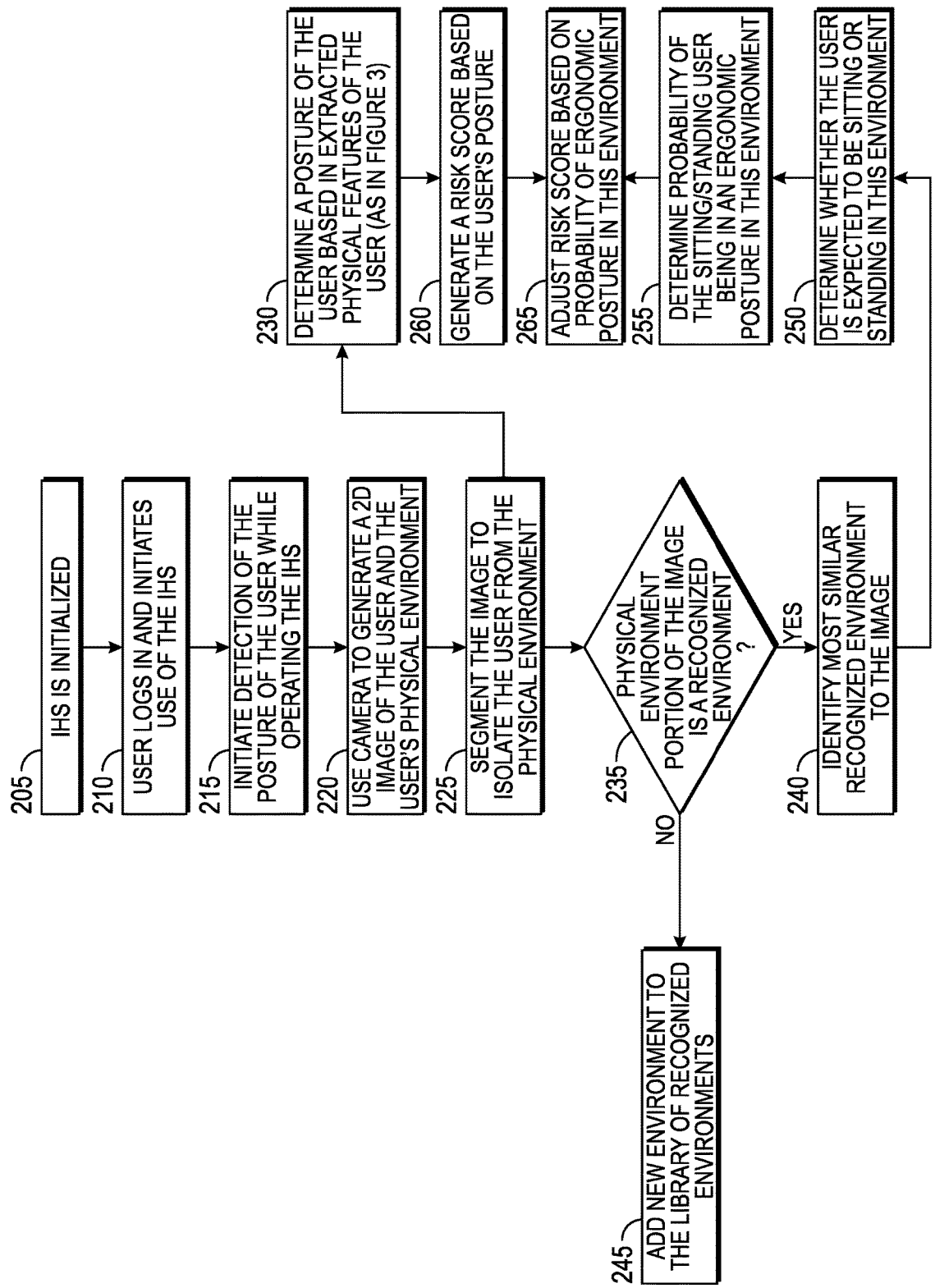
FIG. 2 is a flow chart diagram illustrating certain steps of a process according to various embodiments for context-based detection of physical postures of a user of an IHS.

FIG. 2 is a flow chart diagram illustrating certain steps of a process according to various embodiments for context-based detection of physical postures of a user of an IHS. As illustrated, embodiments may begin at block 205 with the initialization of an IHS, such as the IHS described with regard to FIG. 1, that includes two-dimensional and, in some instances, three-dimensional imaging capabilities. Once the IHS has been initialized and the operating system of the IHS is booted, at 210, the user may login to the IHS and/or operating system and may commence operation of the IHS through use of software applications that are supported by the operating system of the IHS. The user will typically operate the IHS while facing an integrated display of the IHS, or in some cases an external display the is coupled to the IHS. The physical characteristics in which the user holds their body while operating the IHS may be referred to as the user's posture. Postures that are considered ergonomic are those in which the user is aligned and positioned relative to the IHS such that the user's body is not unnecessarily strained. As described, operating an IHS for prolonged periods of time while positioned in non-ergonomic postures may result in the user experience a variety of physical symptoms.

Upon operation of the IHS being initiated, at 215, embodiments initiate detection of the physical posture of the user relative to the IHS. Some embodiments may initiate posture detection at periodic intervals during the ongoing operation of the IHS. For instance, embodiments may determine the posture of the user of the IHS at regular and configurable intervals, such as every minute. Embodiments may additionally or alternatively initiate posture detection upon certain conditions, such as in response to detecting a lack of movement and/or activity by the user for over a certain duration of time. As described in additional detail below, embodiments may generate a risk score based on the detected posture of the user, where the risk score quantifies the risk of physical side effects for particular non-ergonomic postures. In such embodiments, embodiments may initiate posture detection procedures more regularly as the risk scores for the user's posture increase. As such, embodiments may detect postures more frequently for users with poor ergonomics. Also as described below, these risk scores that are assigned based on the user's detected posture may be scaled upwards or downwards based the physical environment in which the user is detected to be operating the IHS. For instance, a user may be expected to exhibit poorer posture while working from home or in a public location when compared to when the user is using the IHS at an office location. Accordingly, embodiments may detect user postures more frequently based on the determined location at which the user is operating the IHS, where this location may be determined based on segmented analysis of the captured image used to determine the user's posture, as described in additional detail below.

As indicated in FIG. 2, upon initiating posture detection procedures, embodiments initiate generation of a two-dimensional image of the user, and as a consequence, at least a portion of the physical environment in which the user is operating the IHS. As described in additional detail with respect to FIG. 3, in some embodiments, the user's posture may be more accurately determined through a bifurcated process that utilizes the two-dimensional image that is captured using a camera of the IHS and also using a separate three-dimensional image that is captured using a depth-sensing capability of the IHS. With regard to the two-dimensional image, as described with regard to FIG. 1, an IHS according to embodiments includes one or more external and/or integrated cameras that are capable of capturing images, as well as capturing video in most circumstances. An IHS may include multiple integrated cameras, but typically includes at least one camera that is positioned to capture images of the user's face as they are using the IHS under typical operating circumstances. External cameras may be located without restriction relative to the IHS, but will typically include a camera similarly positioned to capture the user's face as they are using the IHS.

Figure 3:
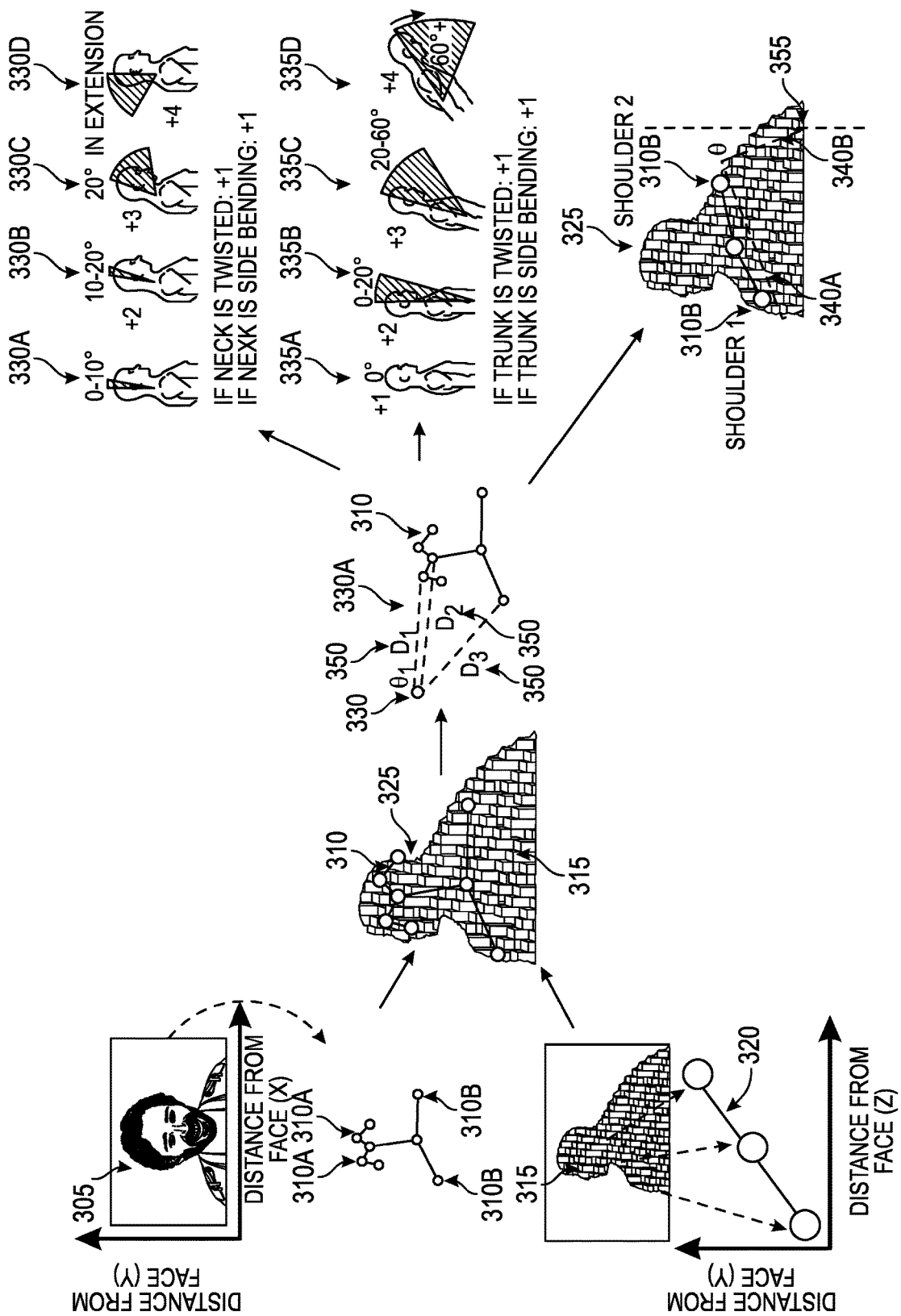
FIG. 3 is a flow chart diagram illustrating additional steps of a process according to various embodiments for detection of physical postures of a user of an IHS.

At 220, such camera capabilities of the IHS are used to capture a two-dimensional image, with the camera settings of the IHS configured to focus the camera on the user that is positioned at their expected location while operating the IHS, such as facing the display screen of the IHS from approximately an arms-length distance from the display screen, as illustrated in image 305 of FIG. 3. In this manner, the camera capabilities of the IHS may capture an image 305 of the user as they face the display of the IHS, and thus as they operate the IHS. At 225 of FIG. 2, standard image processing capabilities are utilized to process the captured two-dimensional image in order to isolate the user from the rest of the image, and in particular to isolate the user from the background behind the user and from any surfaces in front of the user, such as from a desk or table. Through this segmentation of the captured image, the user is isolated from the physical environment in which user is located.

With captured image segregated, at 235, the segmented image of the physical environment is evaluated to determine whether the user is operating the IHS in a known physical environment. Some embodiments may maintain a library of image templates that corresponding to physical environments in which the user has previously operated the IHS and for which data is available for use in evaluating the ergonomics of the user's posture. In particular, the physical environment templates represented in the library may each be annotated with information specifying characteristics of the position from which the user operates the IHS in a particular environment. For instance, a physical environment template corresponding to an office workspace may specify that the user operates the IHS while standing at this workstation. A physical environment template corresponding to a home office may specify that the user operates the user operates the IHS while sitting, and in particular may specify the user is sitting at a desk. A physical environment template corresponding to a home office may specify that the user operates the user operates the IHS while sitting, and in particular may specify the user is sitting at a couch or other non-desk seating.

As indicated in FIG. 2, at 240, the physical environment template that most closely resembles the segmented physical environment image is identified as the most likely location at which the user is operating the IHS. In some embodiments, a physical environment template may represent various types of information that may be used to identify a particular location. For instance, color information may be used to identify particular rooms that are painted in distinctive colors, or to identify specific workspaces, such as cubicle. Templates may also specify locations of fixed objects in the background of the user, such as the locations of windows, furniture, lights and hanging artwork. Templates may also specify general locations of certain non-fixed objects that may be found in a specific physical environment. For instance, a template may include foreground information that specifies the general location of an external keyboard and mouse that are utilized in a particular environment, such as a home office. Through identification of such types of objects and other indicators of the user being located in specific room, the template is identified that most closely matches the segmented image of the physical environment. As described with regard to FIG. 1, an IHS according to embodiments may include capabilities for determining a physical location of the IHS, such as using a GPS receiver signals and such as network signal identification and triangulation.

A user will occasionally operate in an IHS in a new physical environment. In such instances, embodiments may initiate procedures, at 245, for classifying the new environment. The segmented image of the physical environment may be processed in order to generate a template that may identify objects in the background and/or foreground of the user and may also characterize lighting and/or color information that may be used to identify this particular environment. In some embodiments, upon detecting a new physical environment, the user may be prompted to specify whether they are sitting or standing, and in some instances to specify whether they seated at a desk, on a couch, on the floor, or various other possible seating positions that may provide an indication of whether the user is likely to be sitting in an ergonomic position while in this physical environment. In some embodiments, machine learning techniques may be used to generate templates of new physical environments, such as through training based on templates that have been effectively used in recognizing the physical environment in which the user is operating the IHS.

If the environment of the segmented physical environment image is recognized as a known location, at 250, the annotations for the template of this known location are consulted to determine whether the user is expected to be standing or sitting while operating the IHS. Where the user is expected to be sitting in a particular environment, the annotations may further specify the type of seating the user is expected to be using, such as desk chair or a sofa. Industry analysis of ergonomic assessments have demonstrated that an individual's posture is more likely to be non-ergonomic (i.e., a posture resulting in unnecessary physical strain on the individual due to positioning of the individual that does not conform to a neutral position of an ideal posture), when an individual is sitting, versus when the individual is standing.

Individuals tend to exhibit more ergonomic postures when standing. Industry analysis has shown that an average individual has an 80% probability of using an ergonomic posture when standing, but only a 55% probability of using an ergonomic posture when sitting. Accordingly, posture determinations may be more accurately made for an individual that is operating an IHS from a standing position when compared to the accuracy that can be expected when the user is seated. Moreover, when the user is sitting, the accuracy of the posture predictions may vary based on the type of seating in use. Individuals may have a 60% probability of using an ergonomic posture when using a desk chair, but only a 40% probability of using an ergonomic posture when seated on a couch. At 255, such probability information is determined for the physical environment template that has been determined to correspond to the physical environment from the segmented image.

As illustrated in FIG. 2, in conjunction with this analysis of the segmented image in determining information about the physical environment in which the user is operating the IHS, at 230, embodiments determine the posture in which the user is positioned relative to the IHS, as described in detail with regard to FIG. 3. As described below, at 260, embodiments may calculate a risk score for the detected posture of the user, where the risk score provides a quantitative assessment of the risk of physical side effects due to the user's detected posture. At 265, this ergonomic risk score is scaled based on the characteristics of the physical environment in which the user is operating the IHS. For instance, in a scenario where embodiments determine the user is operating the IHS in a physical environment in which the user is standing, the risk score may be scaled downward due to the lower probability of a non-ergonomic posture by an individual that is standing. Conversely, the risk score assigned to a posture may be scaled upwards for an environment where the user is sitting, due to the higher probability of a non-ergonomic posture by a seated individual. The risk score may be scaled upwards to a greater degree for an environment in which the user is sitting on a couch verses the amount of scaling for an environment in which the user is sitting at a desk chair. The scaled risk score may be used to track the user's posture over time and to do so both in aggregate and also separately for different environments in which the user operates the IHS. In addition, the scaled risk score may be used to issue notifications to the user, where such notifications may provide notice of detected non-ergonomic positioning by the user and may provide ergonomic suggestions for the user, such as suggesting the user remain more aware of leaning to the right, or sitting at an orientation that is twisted relative to the IHS.

FIG. 3 is a flow chart diagram illustrating additional steps of a process according to various embodiments for detection of physical postures of a user of an IHS. As described with regard to FIG. 2, embodiments utilize one or more cameras of the IHS to capture a two-dimensional image of the user while operating the IHS, where the image thus also captures at least a portion of the physical environment in which the user is operating the IHS. Also as described, the captured image is segmented such that the user is isolated from physical environment that is also captured in the image, thus isolating the image of user from the background and foreground of the physical environment. As indicated in FIG. 3, the captured two-dimensional image 305 is processed in order to locate physical features on the user's body that correspond to landmarks 310 that are usable for determine the position of the user's body, and in particular the positions of the user's head and trunk, relative to the IHS. For instance, physical features that may be utilized as landmarks may include features such as the user's eyes, the user's mouth, the user's chin, the user's cheekbones, the top of the user's head, each side of the user's head, locations on the user's shoulders and/or the base of the user's neck. In the set of landmarks 310 of FIG. 3, landmarks 310a may correspond to the location of the user's eyes and landmarks 310b may correspond to the location of the ends of each of the user's shoulders.

In some instances, embodiments may rely on biometric image processing capabilities that are available to the IHS in order to identify such physical feature landmarks 310 in the captured image 305 of the user. In such embodiments, the landmark features 310 of the user may be identified using a library of biometric prints of the user, where the biometric prints may specify the relative locations of the landmark features of the user, when the user is at a certain distance and orientation relative to the IHS. Embodiments may generate a map of the identified landmarks features of the user, such as the illustrated map of landmarks 310 of FIG. 3, where the map may include the locations of each of the physical landmarks on a coordinate plane, which may correspond to a vertical plane of the user.

As indicated in FIG. 3, in addition to capturing a two-dimensional image 310 of the user, a three-dimensional image 315 of the user is also captured. For instance, a depth-sensing capability of the IHS, such as an infrared time-of-flight sensor, may be used to generate a three-dimensional representation 315 of the user as they operate the IHS. In some instances, the two-dimensional image 305 and the three-dimension image 315 may be collected in the reverse order from this description, or may be collected in parallel with each other when the IHS supports such capabilities.

In some instances, the three-dimensional image 315 of the user as they operate the IHS may be generated by the time-of-flight sensor by broadcasting patterns of infrared signals that are each used to measure the distance from a point on the user's body to the sensor, and thus providing a measurement of the distance of particular points on the user's body to the IHS. The generated three-dimensional image 315 of the user is constructed from these time-of-flight measurements, thus providing an estimate of the distance between the IHS and different parts of the user's body that are visible to the time-of-flight sensor. As with the captured two-dimensional image 305, the three-dimensional image 315 may be similarly processed in order to isolate the user from the background and foreground that is also captured.

As indicated in FIG. 3, in some embodiments, the relative distances between the different parts of the user's body may be determined through a regression analysis 320 of the measurements collected by the time-of-flight sensor. Embodiments may annotate this three-dimensional image with the distance measurements that are estimated for specific points on the user's body and for general areas or portions of the user's body, such as for the user's truck and for areas where landmark physical features of the user are expected to be found. In addition, the regression analysis may be further utilized to estimate distances from the IHS to portions of the user's body that are obscured, such as from a portion of the user's trunk that is below the surface of a desk where the user is seated, or where the user head is partially outside of the captured image 305.

In some embodiments, characteristics of the regression analysis that is utilized may be selected based on the physical environment in which the user is operating the IHS. As described above, embodiments may evaluate the segmented portion of the captured two-dimensional image that includes the background and foreground of the physical environment in order to classify the physical environment as being recognized, or as unrecognized. In scenarios where the physical environment is recognized, embodiments may track whether the user is expected to be standing or sitting while operating the IHS in this particular environment. As described above, ergonomic postures are more likely to be seen with a user that is standing than with a user that is sitting. Accordingly, in scenarios where the physical environment captured in image 305 indicates the user is standing, the regression analysis utilized to estimate distances from the IHS to obscured portions of the user's body may assume a smaller deviation is present in the distances from the IHS to the different portions of the user's body. On the other hand, in scenarios where the user is determined to be located in a physical environment where the user is sitting while operating the IHS, a linear regression may be selected that expects greater deviations in the distances to the obscured portions of the user's body, such as due to slouching in a chair such that the user is included or declined relative to the IHS.

Once both the three-dimensional image 315 of the user has been captured and annotated with distances from the IHS and when the landmark features 310 have been identified within the two-dimensional image 305 of the user, the set of landmarks 310 is overlayed 325 onto the three-dimensional image 315, as illustrated in FIG. 3. In some embodiments, the landmark features 310 may be located on the three-dimensional image 315 to generate the overly 325 using machine learning capabilities that may be trained using a series of two-dimensional and three-dimensional images of the user that are generated in a controlled environment and with the user oriented relative to the IHS at pre-defined positions, such as sitting directly facing the IHS at a known distance and such as sitting at a specific degree of rotation relative to the IHS (e.g., with the user looking fifteen degrees to the right of the display of the IHS), and such as sitting at a specific incline relative to the IHS (e.g., with the user bent forward thirty degrees towards the IHS).

As indicated in FIG. 3, through the use of this overlay 325 of landmark physical features of the user's body onto the three-dimensional image, distances 350 from the IHS 330 to the landmark features 310 of the user's body are determined. For instance, distances may be determined such as the distance d1 from the IHS 330 to the landmark corresponding to the user's right eye, and such as distance d2 from the IHS 330 to the landmark corresponding to the user's nose, and such as distance d3 from the IHS 300 to the user's right shoulder. In this manner, distances from the IHS 330 to each of the landmarks physical features of the user may be determined. Also as indicated in FIG. 3, angles, such as angle θ1 from the IHS to the landmark corresponding to the user's right eye, may also be determined and recorded for use in determining the posture of the user.

Based on the distance and angle measurements calculated from the overly 325 of the landmarks 310 on the three-dimensional image 315, embodiments determine a posture of the user relative to the IHS. In some embodiments, the posture of the user may be determined based on the degree to which the user's head and trunk are inclined or declined relative to the IHS, and further based on the degree of rotation of the user relative to the IHS, and further based on the degree to which the user is leaning laterally away from a vertical centerline of the display of the IHS.

Accordingly, as illustrated in FIG. 3, four possible positions 330a-d of the user's head may be determined, where these positions determine the degree to which the user's head is inclined towards the display of the IHS or reclined away from the IHS. For instance, in head position 330a, the user's head is inclined from zero to ten degrees towards the IHS, where the degree of incline may be relative to the plane corresponding to the display screen of the IHS. In head position 330b, the user's head is inclined from ten to twenty degrees towards the IHS. In head position 330c, the user's head is inclined greater than twenty degrees towards the IHS. In head position 330d, the user's head is declined away from the IHS. Such determinations may be made from the calculated distances determined from the overlay 325 of the landmarks on the three-dimensional image of the user. For instance, the distance from the IHS to the user's chin and/or forehead provides an indication of the degree of tilt of the user's head. Embodiments may utilize machine learning models trained with a series of pre-defined images captured in controlled environment, such as described above, in order to classify the head position 330*a-d* of the user from the landmark locations and calculated landmark distances.

In this same manner, four possible positions 335*a-d* of the user's trunk may be determined, where these positions determine the degree to which the user's trunk is inclined towards the display of the IHS or reclined away from the IHS. For instance, in trunk position 335*a*, the user's trunk is neutral relative to the IHS. In trunk position 335*b*, the user's trunk is inclined up to twenty degrees towards the IHS. In trunk position 335*c*, the user's trunk is inclined from twenty to sixty degrees towards the IHS. In trunk position 335*d*, the user's trunk is inclined more than twenty degrees towards the IHS. As above, such determinations may be made from the calculated distances determined from the overlay 325 of the landmarks on the three-dimensional image of the user. For instance, distances from the IHS to different points on the user's trunk may provide an indication of the degree to which the user's trunk is tilted towards the IHS. As before, embodiments may utilize machine learning models trained with a series of pre-defined images captured in controlled environment to classify the trunk position 335*a-d* of the user based on the detected positions of the landmarks and the calculated landmark distances.

As indicated in FIG. 3, posture determinations may also be based on the degree to which the user is leaning to either side of the IHS, such as from a vertical centerline of the display of the IHS. For instance, in FIG. 3, the degree to which the trunk of the user is leaning away from a vertical axis 355 may be determined from the landmark information. For instance, any difference in the heights of the shoulder landmarks 310*b* may be compared to determine a degree of horizontal tilt 340*a* of the user's trunk, which is used to calculate a degree of vertical tilt 340*b* of the user's trunk. In this same manner, the location of the landmarks corresponding to the user's eyes may be compared to determine a degree of lateral tilt of the user's head.

As described, the posture of the user of the IHS may also be determined based on the degree of rotation of the user relative to the IHS. From the calculated distance measurements for the landmarks, embodiments may determine the difference in distances between corresponding symmetrical landmarks in order to determine the degree to which the user is rotated relative to the IHS. For instance, the degree of rotation of the user's trunk may be determined based on the difference between the distances from the IHS to landmarks corresponding to each of the user's shoulders. Similarly, the degree of rotation of the user's head may be determined based on the difference between the distances from the IHS to landmarks corresponding to each of the user's eyes or cheekbones.

As described above, the determined posture of the IHS may be used to generate a posture risk score, where the risk score quantifies the degree to which the user's current posture deviates from an ideal ergonomic posture for the user relative to the IHS. As described, the posture of the user may be determined based on the degree to which the user's head and/or trunk are inclined towards or declined away from the display of the IHS, the further based on the degree to which the user is leaning to one side and the degree to which the users head and/or trunk are twisted relative to the IHS. These characteristics of the user's posture may be used to generate the posture risk score.

In some embodiments, each of these characteristics of the user's posture may be used to generate a risk score based on the Rapid Upper Limb Assessment (RULA) scoring methodology that provides a quantified ergonomic risk for an individual's body position when performing a specific task. By calculating a RULA score for the postures in which the user operates the IHS, embodiments are able to track the progress or degradation of the user's posture over time. In some embodiments, the risk score may be based on the degree to which the user's head is inclined towards or declined from the IHS. As illustrated in FIG. 3, the neutral or near neutral amount of head tilt of position 330*a* does not add to the risk score, while position 330*b* with a ten to twenty decree incline towards the IHS adds two points to the risk score. Position 330*c* with a greater than twenty-degree incline adds three points to the risk score and position 330*d* with a declined head position adds four points to the risk score. In this same manner, the neutral trunk position 335*a* adds a single point to the risk score, while position 335*b* with up to a twenty-decree incline of the trunk towards the IHS adds two points to the risk score. Position 335*c* with a twenty to sixty degree trunk incline adds three points to the risk score and position 335*d* with a greater than sixty degree inclined trunk position adds four points to the risk score. As indicated in FIG. 3, the risk score may increase by one if the user's head is twisted (i.e., rotated) relative to the IHS and increased by one if the user's trunk is twisted relative to the IHS. The risk score is increased by one if the user's head is leaning relative to the IHS and increased by one if the user's trunk is leaning. In this manner, the risk of physical side effects from non-ergonomic aspects of the user's posture may be determined and quantified such that the risk score can be used to track changes in the user's posture over time, and to provide the user with alerts and instructions for improving the ergonomics of their posture as they operate the IHS.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   one or more processors;
   one or more cameras;
   a memory device coupled to the one or more processors, the memory device storing computer-readable instructions that, upon execution by the one or more processors, cause the IHS to:
      utilize the one or more cameras of the IHS to generate a two-dimensional image of a user of the IHS and of a portion of a physical environment in which the user is located while operating the IHS;
      process the image to generate segregated images of the user and of the physical environment in which the user is located;
      classify the segregated image of the physical environment as corresponding to a known physical environment in which the user has operated the IHS, wherein the known physical environment is associated with a probability of the user being in an ergonomic posture while operating the IHS in that environment;
      use the segregated image of the user to determine a physical posture of the user relative to the IHS;
      generate an ergonomic risk score based on deviations of the determined posture of the user from an ideal posture; and
      scale the ergonomic risk score based on the probability of the user being in an ergonomic posture while operating the IHS in the physical environment.

2. The IHS of claim 1, wherein the ergonomic risk score is tabulated using a Rapid Upper Limb Assessment (RULA) ergonomic scoring system.

3. The IHS of claim 1, wherein the segregated image of the physical environment comprises at least one of a background behind the user and a foreground in front of the user.

4. The IHS of claim 3, wherein the foreground in front of the user comprises a working surface and input/output (I/O) devices resting on the working surface.

5. The IHS of claim 1, wherein the segregated image of the physical environment is classified as corresponding to a known physical environment based on a comparison of the segregated image of the physical environment to a library of images corresponding to a plurality of physical environments templates.

6. The IHS of claim 5, wherein the template physical environments specify whether the user is sitting or standing when operating the IHS in a respective physical environment.

7. The IHS of claim 6, wherein, when a template physical environment specifies the user is sitting, the probability of the user being positioned in an ergonomic posture results in the ergonomic risk score being scaled upwards.

8. The IHS of claim 6, wherein, when a template physical environment specifies the user is standing, the probability of the user being positioned in an ergonomic posture results in the ergonomic risk score being scaled downwards.

9. The IHS of claim 1, wherein the segregated image of the physical environment is classified as corresponding to a known physical environment based on wireless signal information collected by the IHS that specifies a physical location of the IHS.

10. The IHS of claim 1, wherein further execution of computer-readable instructions by the one or more processors causes the IHS to:
   utilize a time-of-flight sensor of the IHS to generate a three-dimensional image of the user for use in determining the physical posture of the user relative to the IHS, wherein the three-dimensional image of the user comprises a plurality of measurements of distances from locations on the body of the user to the IHS.

11. The IHS of claim 10, wherein further execution of computer-readable instructions by the one or more processors causes the IHS to:
   identify a plurality of physical feature landmarks of the user in the two-dimensional image generated using the one or more cameras; and
   overlay the physical feature landmarks of the user onto the three-dimensional image.

12. The IHS of claim 11, wherein overlaying the physical feature landmarks onto the three-dimensional image of the user provides distances of the respective physical feature landmarks to the IHS.

13. The IHS of claim 12, wherein the respective distances of the physical feature landmarks from the IHS are utilized to determine the physical posture of the IHS.

14. The IHS of claim 11, wherein the physical feature landmarks comprise locations corresponding to at least one of the user's eyes, shoulders, mouth, nose, chin, and top of the user's head.

15. A method for context-based determination of a posture of a user of an Information Handling System (IHS), the method comprising:
   utilizing one or more cameras of the IHS to generate a two-dimensional image of the user of the IHS and of a portion of a physical environment in which the user is located while operating the IHS;
   processing the image to generate segregated images of the user and of the physical environment in which the user is located;
   classifying the segregated image of the physical environment as corresponding to a known physical environment in which the user has operated the IHS, wherein the known physical environment is associated with a probability of the user being in an ergonomic posture while operating the IHS in that environment;
   using the segregated image of the user to determine a physical posture of the user relative to the IHS;

generating an ergonomic risk score based on deviations of the determined posture of the user from an ideal posture; and scaling the ergonomic risk score based on the probability of the user being in an ergonomic posture while operating the IHS in the physical environment.

16. The method of claim 15, wherein the ergonomic risk score is tabulated using a Rapid Upper Limb Assessment (RULA) ergonomic scoring system.

17. The method of claim 15, wherein the segregated image of the physical environment comprises at least one of a background behind the user and a foreground in front of the user.

18. A non-transitory computer-readable storage device having instructions stored thereon for context-based determination of a posture of a user of an Information Handling System (IHS), wherein execution of the instructions by one or more processors of the IHS causes the one or more processors to:

utilize the one or more cameras of the IHS to generate a two-dimensional image of the user of the IHS and of a portion of a physical environment in which the user is located while operating the IHS;

process the image to generate segregated images of the user and of the physical environment in which the user is located;

classify the segregated image of the physical environment as corresponding to a known physical environment in which the user has operated the IHS, wherein the known physical environment is associated with a probability of the user being in an ergonomic posture while operating the IHS in that environment;

use the segregated image of the user to determine a physical posture of the user relative to the IHS;

generate an ergonomic risk score based on deviations of the determined posture of the user from an ideal posture; and scale the ergonomic risk score based on the probability of the user being in an ergonomic posture while operating the IHS in the physical environment.

19. The non-transitory computer-readable storage device of claim 18, wherein the segregated image of the physical environment is classified as corresponding to a known physical environment based on a comparison of the segregated image of the physical environment to a library of images corresponding to a plurality of physical environments templates.

20. The non-transitory computer-readable storage device of claim 19, wherein the template physical environments specify whether the user is sitting or standing when operating the IHS in a respective physical environment.

* * * * *